United States Patent Office 3,142,573
Patented July 28, 1964

3,142,573
LAMINATED DOUGH
Arthur B. Erekson, Scarsdale, and Samuel A. Matz, Liverpool, N.Y., assignors to The Borden Company, a corporation of New Jersey
No Drawing. Filed July 20, 1961, Ser. No. 125,389
6 Claims. (Cl. 99—90)

This invention relates to a preleavened laminated dough ready for baking in making rolls, biscuits, pastry, or the like bakery products, and has particular reference to canned refrigerated preleavened laminated dough for rolls and will be illustrated by description in connection with such use.

As used herein the term "laminated dough" refers to doughs made by interleaving layers of solid shortening between layers of dough so that upon baking a separation of dough strata occurs. Puff pastry is an example of a bakery product made with laminated dough in which no leavening agent is employed and Danish pastry is made with a laminated dough in which yeast-leavening action is employed.

In commercial refrigerated dough practice there is ordinarily used, as a leavening agent, a slowly acting sodium pyrophosphate in combination with sodium bicarbonate. All ingredients are mixed, the resultant dough rolled out, and the dough then sheeted and cut into blanks that are stacked and packed into cans in numbers to make the cans about 80 to 90% full. The cans are then immediately closed. Such processing ordinarily requires 10–20 minutes. The cans are not gas tight so that during the following two to three hours of proofing (expansion of dough at room temperature such as 60–75° F.) the expansion of the dough causes the air to be driven from the can through the gas escape outlets or vents. When the dough has expanded sufficiently to fill the can, the expanded dough seals the gas vents so that further escape of gas is prevented. A pressure due to carbon dioxide is maintained within the cans, so long as the canned rolls are kept at a temperature between 32°–55° F., until such time as the cans are opened and the rolls removed and baked in the customary manner.

One of the difficulties encountered has been the formation of phosphate crystals in the canned dough on standing resulting in an unsatisfactory product as illustrated in the Erekson et al. Patent No. 2,942,988. As set forth therein fumaric acid is added in order to prevent the formation of any such disodium phosphate crystals.

In addition to the formation of phosphate crystals, the preparation of preleavened refrigerated laminated doughs has not been commercially successful because the extended periods of time needed to process the doughs results in the loss of large amounts of the carbon dioxide due to the increased activity of the baking acid on the bicarbonate of soda. Laminated doughs require longer periods of time to process than conventional doughs because the requirement for interleaving layers of solid shortening between layers of dough necessitates repeated layering, folding, and passing of the dough through dough brakes with rest periods after passage therethrough. In contrast to the 10–20 minutes' processing time required for other refrigerated doughs, laminated doughs require 30–60 minutes' processing time from mixing to canning. The loss of gas due to extended processing results in raising the proofing time to 6 to 12 hours and in products which will not rise properly or bake properly when removed from the container. Also, the resulting gas pressure in the can due to carbon dioxide is so low that the dough does not expand to fill the containers as required. This results in failures in keeping quality in a considerable number of cans packed and in baked product lacking the size and desirable texture necessary for an acceptable product.

It has now been found that canned refrigerated laminated doughs can be prepared that are free from separation of phosphate crystals without loss of undesirable amounts of carbon dioxide during the processing. The invention also provides refrigerated laminated roll doughs which have a soft, porous, bread like texture when baked.

Briefly stated, the present invention comprises a laminated dough for refrigerated storage comprising layers of a moistened cereal flour dough containing an active alkaline bicarbonate of baking grade and a slow acting alkali metal phosphate of baking grade, and, interleaved between the layers of dough, layers of a roll-in solid shortening containing an edible solid organic acid dispersed therein so as to be isolated from the moistened dough. The invention also comprises the process of making such dough.

As to materials, the flour, water, shortening, seasoning agents and other minor ingredients employed in the dough are those conventionally used for rolls, biscuits and the like, and are used in the proportions commonly used for refrigerated doughs.

The active alkaline bicarbonate is of a baking grade. Suitable examples are sodium bicarbonate, which is preferred, and potassium bicarbonate.

The slow acting alkali metal phosphate used is preferably an essentially anhydrous sodium acid pyrophosphate of a particle size to pass substantially completely through a U.S. standard 20 mesh screen and usually also through 60 mesh and at least 50% through 200 mesh. Other suitable phosphates are sodium aluminum phosphate hydrate, and sodium aluminum phosphate anhydrous.

The edible organic acid used is one which will prevent the formation of phosphate crystals in the dough and which is also substantially insoluble in the roll-in shortening. Examples of such acids are adipic acid, glucono-delta-lactone, citric acid, tartaric acid and fumaric acid. Of these, fumaric acid is preferred because it is slower in action than the other acids. The organic acid is also preferably used in the form of granules of a size to pass completely through a 30 mesh screen and at least 70% to be retained on 100 mesh.

The roll-in solid shortenings used are those conventionally used to prepare puff pastry or Danish pastry. They all have the common characteristic of not melting until the dough is being baked. Suitable examples are butter, lard, margarine and mixtures of animal fats and vegetable fats. The compounded shortenings may also contain added water, salt, and flavoring substances. The term "roll-in" shortenings is used herein to distinguish the shortening interleaved between the layers of dough from that admixed with the flour and other ingredients to form the dough layers.

As to proportions, the alkali metal phosphate is used in the proportion of 1.4–3.0 parts for 100 parts of flour, the fumaric acid 0.30–0.50 part, and these two components together in total amount to correspond, in acid equivalency, to approximately 2.5 to 3.9 parts and for best results about 3.2 to 3.7 parts of the alkali metal phosphate. The other organic acids are used in proportions to equal the neutralizing power of 0.30–0.50 part of fumaric acid.

The active alkaline bicarbonate is used in amounts as required to obtain the desired leavening action under the conditions of use and normally about 1.5–2.0 parts for 100 parts of flour.

The roll-in shortening is used in the proportion of 0.15–0.40 part by weight, and preferably 0.2–0.3 part, for each part by weight of the dough. The thickness of the sheets of roll-in shortening is of importance. The layers of shortening must be of a thickness greater than any dimension of the organic acid particles so that the organic acid particles are completely embedded in a continuous layer of shortening. This is to prevent any substantial reaction of the acid with the carbonate until the shortening melts. With organic acid particles of the size noted above the layer of shortening should have a minimum thickness of 0.03 inch. The organic acid is usually incorporated into the plastic roll-in shortening by mixing by any convenient method yielding satisfactory distribution.

In accordance with the present invention, a dough is made by admixing flour, shortening, flavoring ingredients, water, an active alkaline bicarbonate, and an alkali metal phosphate. The dough is formed into a sheet and a sheet or irregularly shaped piece of roll-in shortening containing an edible organic acid is placed on a portion of the dough. The remainder of the dough sheet is folded over the layer of shortening and the mass is rolled and folded to form a laminated dough with the desired number of layers of dough and shortening. It is important to maintain the temperature of the dough and shortening during layering and folding below the melting point of the shortening to prevent release of the organic acid and consequent premature release of carbon dioxide.

During the processing a limited amount of carbon dioxide is evolved, but isolation of the organic acid in the shortening layers prevents contact of the acid with the aqueous phase of the dough and consequent premature evolution of undesirably large amounts of carbon dioxide. The organic acid only reacts substantially with the bicarbonate when the shortening begins to melt.

The invention will be further illustrated by the following specific examples of the practice of it. In these examples, and elsewhere herein, proportions are expressed as parts by weight on the dry basis except that the flour is stated on the basis of a moisture content of 14%.

*Example 1*

A premixed dough was made by combining the following ingredients in a conventional dough mixer.

| Ingredient | Parts by weight |
|---|---|
| Flour | 100 |
| Non-fat dry milk | 6.25 |
| Cane sugar | 6.25 |
| Shortening (margarine) | 6.25 |
| Salt | 1.4 |
| Sodium bicarbonate | 2 |
| Sodium acid pyrophosphate (RD-1) | 2.8 |
| Water | 53.3 |

The dough was then chilled to a temperature of about 60° F. In order to make handling easier, the dough was then divided into pieces weighing 30 lbs., each of which was processed separately. Each piece was passed through a set of rollers to produce a sheet about 16 inches wide, 45 inches long, and 1½ inches thick. Two and one-half pounds of a roll-in shortening compounded from hard animal fats, vegetable oils, water, salt and flavors and containing 2.0% fumaric acid, based on the total weight of the shortening, dispersed therein, formed into a sheet measuring about ⅜ inch thick by 12 inches wide by 15 inches long was placed over the center of the dough sheet. One end of dough sheet was then folded over the shortening, a second sheet of roll-in shortening of identical weight, size and composition as the first was placed on top of the folded section of dough and then the other end of the dough sheet was folded over to cover it. A mass having alternate layers of dough and roll-in shortening was thus formed. This was then passed through a set of rollers, or dough brakes, which flattened and extended the mass and at the same time formed it into a laminated sheet. This extended laminated sheet was then folded into three layers and again passed through the rollers. The resultant laminated sheet now had seven layers of dough with layers of shortening in between. It was folded again into three layers and at this point a rest period of ten to twenty minutes was needed to relax the dough to prevent it from tearing during the next pass through the rollers. After the rest period it was rolled again into a sheet of 19 layers of dough with roll-in shortening interleaved between each layer of dough, folded again into three layers, allowed to relax for ten to twenty minutes and then rolled to form a 55 layer sheet.

After another rest period of ten minutes the sheet was folded into the proper width and thickness for cutting into individual rolls. This was accomplished with conventional equipment used for making refrigerated biscuit dough. Such equipment is described in U.S. Patent No. 2,899,787.

Specifically, a sheet ½" thick x 18" wide was passed through a rotary cutter which cut it into hexagonally shaped roll blanks approximately 1½ inches wide and these rolls were then packed into cans in numbers to make the cans 80 to 90% full. The cans were then immediately closed and allowed to proof for about two hours at room temperature. Expansion of the rolls caused the air to be driven from the cans through gas escape vents placed around the seam ends of the cans. When the rolls had sufficiently expanded to fill the can the expanded dough sealed the gas vents and no further escape of the gas was prevented.

At the end of the proofing period the canned rolls were placed in a cooler, approximately 40° F., and held there until the dough had been chilled to that temperature. They were then ready for shipments to the trade, the can being held under refrigeration at 32°–55° F. at all times.

Samples of the dough were removed from the cans from time to time during an 8 week period and at no time were crystals of phosphate or other material separated from the dough. Further there was a noticeable expansion of the rolls before they were baked and a desirable increase in volume during the baking period. The baked rolls had a light and fluffy texture with the layering being very evident.

*Example 2*

The procedure and composition of Example 1 were used with the exception that the fumaric acid was added with the other ingredients in the first mixing operation so that the roll-in shortening contained no fumaric acid. The proofing required 6 to 12 hours once the cans were filled with the rolls indicating that large amounts of leavening gas had been lost. During the ensuing eight week test period, in which the cans were kept at 35°–50° F., complete failures were found in keeping quality in a considerable number of the cans packed due to the fact that the resulting gas pressure in the can was too low. The baked products also lacked the volume and desirable texture necessary for an acceptable product.

*Example 3*

Adipic acid and glucono-delta-lactone were substituted for the fumaric acid used in Example 1 in proportions to equal the neutralizing power of the fumaric acid; the remaining ingredients and procedures used being otherwise identical.

It was found that suitable products were made, but that the volume of the baked products was not as large as those made with fumaric acid due to the fact that the adipic acid and glucon-delta-lactone seemed to react more rapidly with the bicarbonate of soda releasing larger amounts of carbon dioxide during the processing.

It will be understood that it is intended to cover all changes and modifications of the examples of the invention herein chosen for the purpose of illustration which do not constitute departures from the spirit and scope of the invention.

We claim:

1. A laminated dough for refrigerated storage and subsequent baking, comprising layers of moistened cereal flour dough containing an active alkaline bicarbonate of baking grade and a slowly acting alkali metal phosphate of baking grade, and layers of a solid shortening interleaved between said layers of dough, said shortening containing an edible solid organic acid selected from the group consisting of fumaric acid, adipic acid, citric acid, tartaric acid and glucono-delta-lactone, said acid being substantially insoluble in said shortening and dispersed therein so as to be substantially completely isolated from the moistened dough and said bicarbonate, phosphate and acid being used in amounts sufficient to properly leaven the dough.

2. A laminated dough for refrigerated storage and subsequent baking, comprising layers of a moistened cereal flour dough containing an active alkaline bicarbonate selected from the group consisting of sodium bicarbonate and potassium bicarbonate and a slowly acting alkali metal phosphate of baking grade selected from the group consisting of sodium acid pyrophosphate, sodium aluminum phosphate hydrate and sodium aluminum phosphate anhydrous; and layers of a solid shortening interleaved between said layers of dough, said shortening containing an edible solid organic acid selected from the group consisting of fumaric acid, adipic acid, citric acid, tartaric acid, and glucono-delta-lactone, said acid being insoluble in the shortening and enrobed thereby so as to be substantially completely isolated from the moistened dough and alkaline carbonate until the temperature of the dough is raised above the melting point of the shortening and said bicarbonate, phosphate and acid being used in amounts sufficient to properly leaven the dough.

3. A laminated dough for refrigerated storage and subsequent baking comprising layers of a moistened cereal flour dough containing sodium bicarbonate and sodium acid pyrophosphate, and layers of a solid shortening interleaved between said layers of dough, said shortening containing fumaric acid and said bicarbonate, phosphate and acid being used in amounts sufficient to properly leaven the dough.

4. A laminated dough for refrigerated storage and subsequent baking comprising layers of a moistened cereal flour dough containing sodium bicarbonate and sodium acid pyrophosphate and layers of a solid shortening interleaved between said layers of dough, said shortening containing fumaric acid, the proportion for 100 parts by weight of flour being approximately 1.4–3 parts by weight of said pyrophosphate on the anhydrous basis and 0.30–0.50 part by weight of said fumaric acid, the total of said pyrophosphate and said fumaric acid being equivalent as acid to about 2.5–3.9 parts by weight of said pyrophosphate, and 1.5–2.0 parts by weight of sodium bicarbonate.

5. A laminated dough for refrigerated storage and subsequent baking comprising layers of a moistened cereal dough comprising flour, shortening, seasoning material, water in amount to make the dough handleable, sodium bicarbonate and sodium acid pyrophosphate and layers of a solid shortening interleaved between said layers of dough, said shortening containing fumaric acid and said bicarbonate, phosphate and acid being used in amounts sufficient to properly leaven the dough.

6. The dough of claim 5 in which the proportion for 100 parts by weight of flour is approximately 1.4–3 parts by weight of said phosphate on the anhydrous basis and 0.30–0.50 part by weight of said fumaric acid, the total of said pyrophosphate and said fumaric acid being equivalent as acid to about 2.5–3.9 parts by weight of said pyrophosphate.

References Cited in the file of this patent

UNITED STATES PATENTS

| | | |
|---|---|---|
| 1,264,592 | Atkinson | Apr. 13, 1918 |
| 1,286,904 | Atkinson | Dec. 10, 1918 |
| 2,942,988 | Erekson et al. | June 28, 1960 |

OTHER REFERENCES

"Everybody's Cook Book," 1924 by Lord, Henry Holt & Co. (New York), pp. 585–586, 590. (Copy in Div. 63.)